Feb. 13, 1934.  S. GULAN, SR., ET AL  1,946,738
ADJUSTABLE SPINDLE PIN
Filed April 3, 1933   2 Sheets-Sheet 2
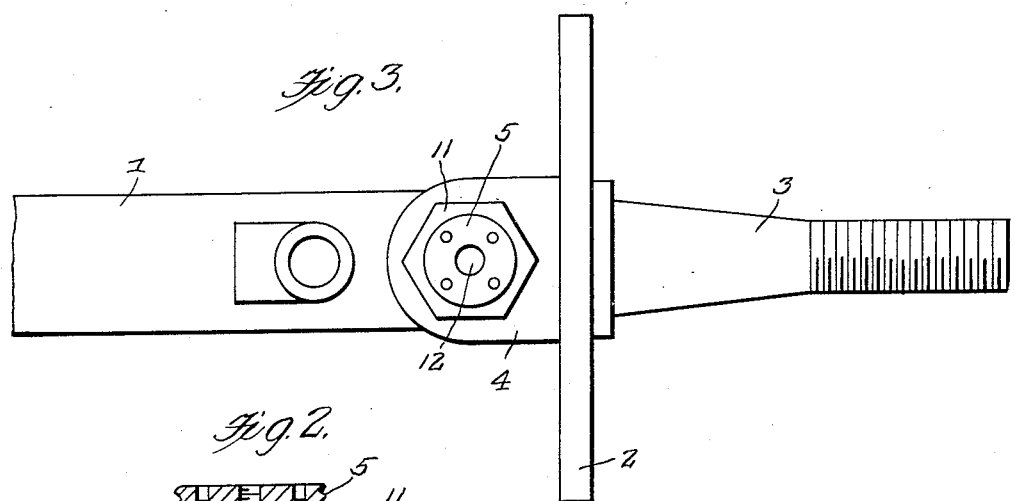
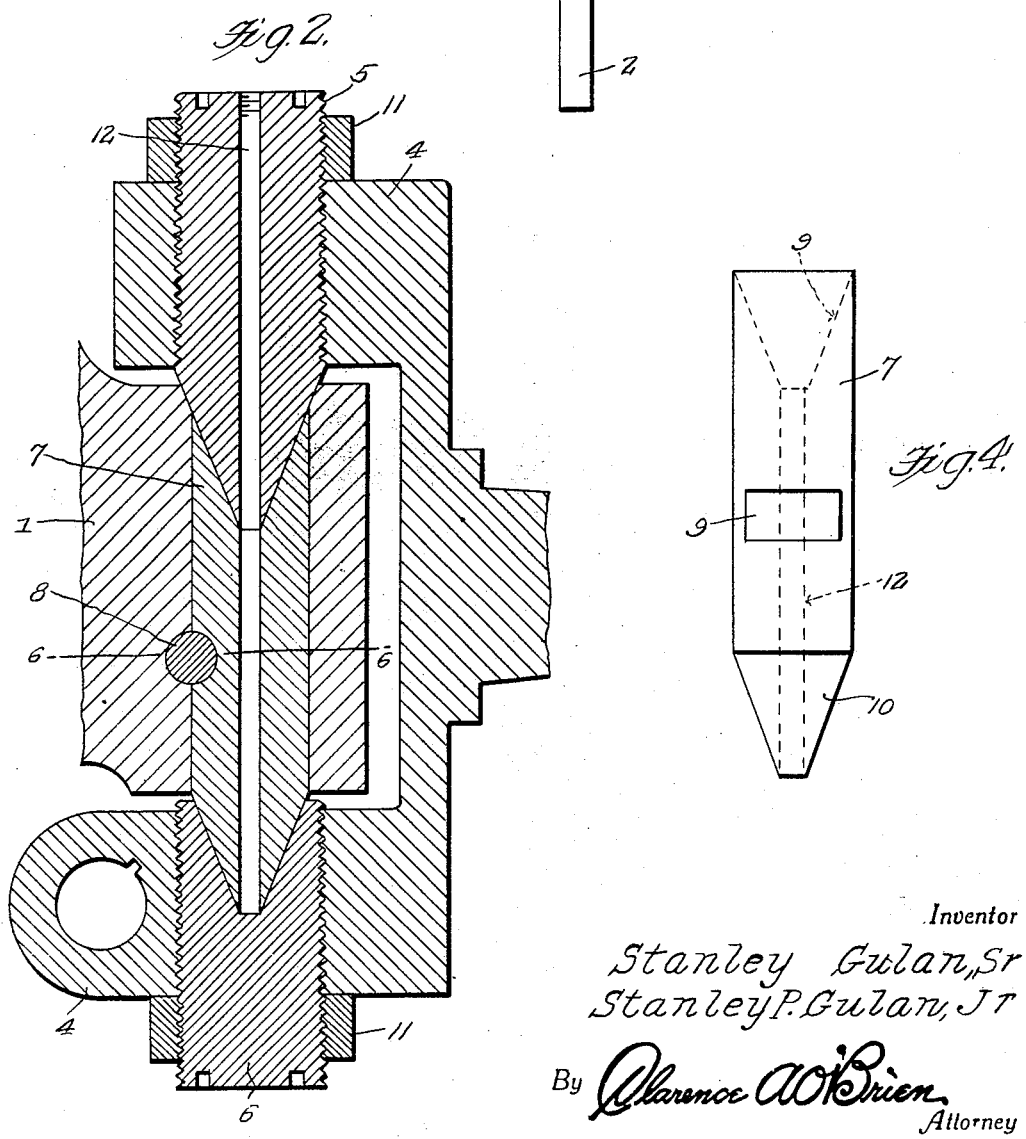
Inventor
Stanley Gulan, Sr
Stanley P. Gulan, Jr
By Clarence A. O'Brien
Attorney Patented Feb. 13, 1934

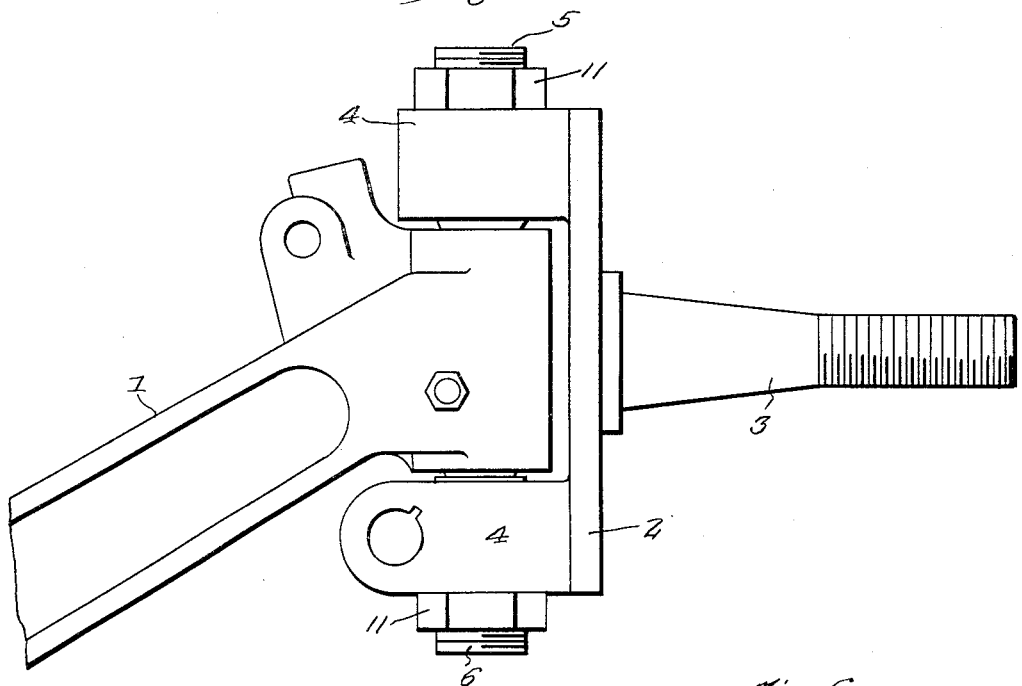
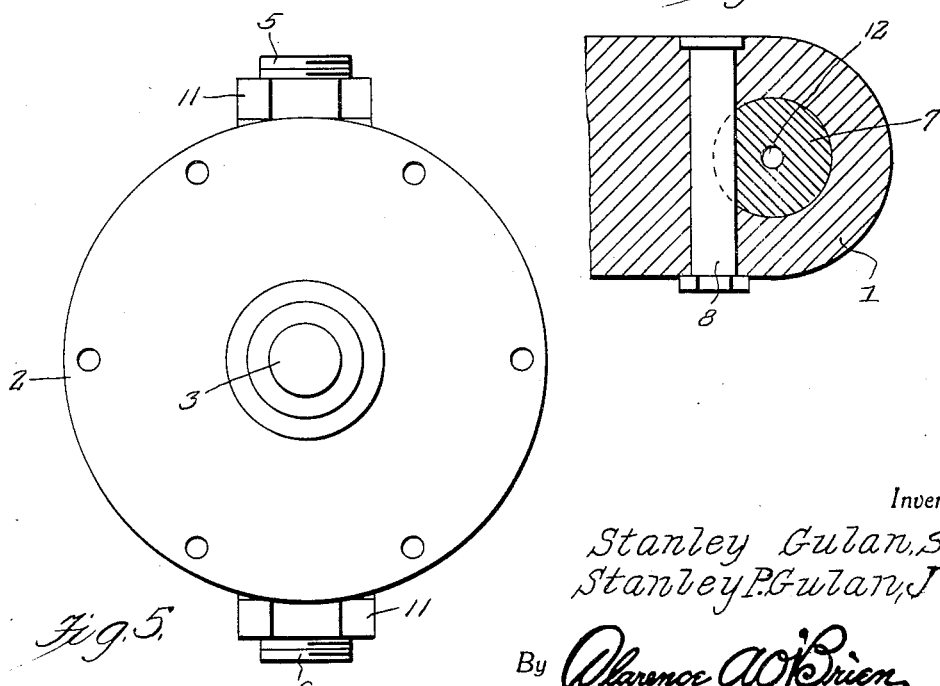

1,946,738

UNITED STATES PATENT OFFICE 1,946,738

ADJUSTABLE SPINDLE PIN

Stanley Gulan, Sr. and Stanley Peter Gulan, Jr., Kenosha, Wis.

Application April 3, 1933. Serial No. 664,281

3 Claims. (Cl. 280—96.1)

This invention relates to an adjustable spindle pin for attaching a wheel carrying spindle of a motor vehicle to the axle, the general object of the invention being to provide a pin held in the axle and having a conical recess at one end and a conical point at its other end, with a pin carried by a part of the spindle member having a conical point engaging the recess in the first pin and a second pin carried by the spindle member having a conical recess for receiving the conical point of the first pin, the pins of the spindle carrying member being adjustable.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation showing the invention in use for attaching a spindle member to an end of an axle.

Figure 2 is a vertical sectional view through Figure 1.

Figure 3 is a top plan view of Figure 1.

Figure 4 is a view of the axle carried pin.

Figure 5 is an end view of the spindle carrying member.

Figure 6 is a section on line 6—6 of Figure 2.

In these drawings, the numeral 1 indicates a portion of an axle and the numeral 2 the spindle carrying member, the spindle of which is shown at 3. This member 2 has on its inner face upper and lower inwardly extending lugs 4 which are provided with aligned vertically arranged threaded openings for receiving the threaded pins 5 and 6. The upper pin 5 is formed with a conical lower end which extends below the lower face of the lug 4 and the lower pin 6 is formed with a conical socket in its upper end. A center pin 7 is inserted in a vertically arranged hole in and end of the axle 1 and is held therein by a bolt 8 which passes through a groove 9 in the pin 7 and through an aligned groove in the axle, as shown in Figure 2, so that the bolt locks the pin 7 in position. This pin 7 is formed with a conical recess in its upper end for receiving the point of the pin 5 and said pin 7 has a conical lower end 10 for fitting in the socket of the pin 6. The two pins 5 and 6 are held in adjusted position by the nuts 11 and the pins 5 and 7 are formed with the longitudinal bores 12 which align with each other and the upper end of the bore of the pin 5 is threaded to receive a lubricant cup or fitting so that lubricant can be introduced into the bores of the pins 5 and 7 to lubricate the parts.

This invention will provide easier steering and maneuvering facilities than the ordinary means for connecting a spindle carrying member to an axle and the parts can be easily and quickly adjusted by a layman so that it cuts the cost of repairs. The device will lessen the number of accidents by preventing shimmying and the parts can be replaced very easily when necessary. Its use saves parts now used with ordinary spindle supporting means, such as ball bearings and bushings and it also saves lubricant. The device can be placed on vehicles as now manufactured with a few inexpensive alterations.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:

1. In combination with an axle and a spindle carrying member, a pin carried by the axle and having a conical recess in one end and a conical point at its other end, the point projecting from the axle, said spindle carrying member having upper and lower inwardly projecting lugs each provided with a vertical threaded hole, pins threaded in said holes, one pin having a point for engaging the recess in the first pin and the other pin having a socket for receiving the point of the first pin.

2. In combination with an axle having a vertically arranged hole adjacent one end and a spindle carrying member having inwardly extending upper and lower lugs on its inner face each provided with a vertical hole, a pin threaded in each hole, the upper pin having a point projecting from the lug and the second pin having a conical socket in its upper end, a pin located in the hole in the axle and having a socket in its upper end for receiving the point of the upper pin with its lower end pointed and projecting from the axle to engage the socket of the lower pin and means for holding the pin in the axle stationary.

3. In combination with an axle having a vertically arranged hole adjacent one end and a spindle carrying member having inwardly extending upper and lower lugs on its inner face, each provided with a vertical hole, a pin threaded in each hole, the upper pin having a point projecting from the lug and the second pin having a conical socket in its upper end, a pin located in the hole in the axle and having a socket in its upper end for receiving the point of the upper pin with its lower end pointed and projecting from the axle to engage the socket of the lower pin, means for holding the pin in the axle stationary and means for introducing lubricant into the upper pin and the pin carried by the axle.

STANLEY GULAN, Sr.
STANLEY PETER GULAN, Jr.